United States Patent

[11] 3,622,029

| [72] | Inventor | Gordon K. Ware |
| | | Chicago, Ill. |
| [21] | Appl. No. | 823,569 |
| [22] | Filed | May 12, 1969 |
| [45] | Patented | Nov. 23, 1971 |
| [73] | Assignee | Ware Fuse Corporation |
| | | Chicago, Ill. |

[54] ELECTRICAL OUTLET BOX
9 Claims, 10 Drawing Figs.

[52] U.S. Cl.................................................. 220/3.7,
174/57, 220/3.94, 220/8
[51] Int. Cl.................................................. H02g 3/08
[50] Field of Search........................................... 220/3, 6,
3.7, 8, 3.94; 174/57

[56] References Cited
UNITED STATES PATENTS
| 689,335 | 12/1901 | Thomas.................. | 220/3.7 |
| 740,663 | 10/1903 | Krantz.................... | 220/3.7 |
| 888,554 | 5/1908 | Tuttle..................... | 220/8 |
| 1,875,101 | 8/1932 | Morrell................... | 220/8 X |
| 2,297,862 | 10/1942 | Bachmann............... | 220/3.7 X |
| 2,369,728 | 2/1945 | Farkas.................... | 220/8 UX |
| 2,422,847 | 6/1947 | Peter...................... | 220/3.7 X |
| 3,433,886 | 3/1969 | Myers..................... | 220/3.7 X |
| 1,850,759 | 3/1932 | MacNeil.................. | 220/3.94 |

Primary Examiner—Joseph R. Leclair
Assistant Examiner—James R. Garrett
Attorney—Olson, Trexler, Wolters & Bushnell ABSTRACT: A box including a first portion for receiving electrical outlets, switches, cover plates and the like of standard size and a second portion telescopically associated with the first portion for increasing the interior volume of the box for accommodating electrical wires.

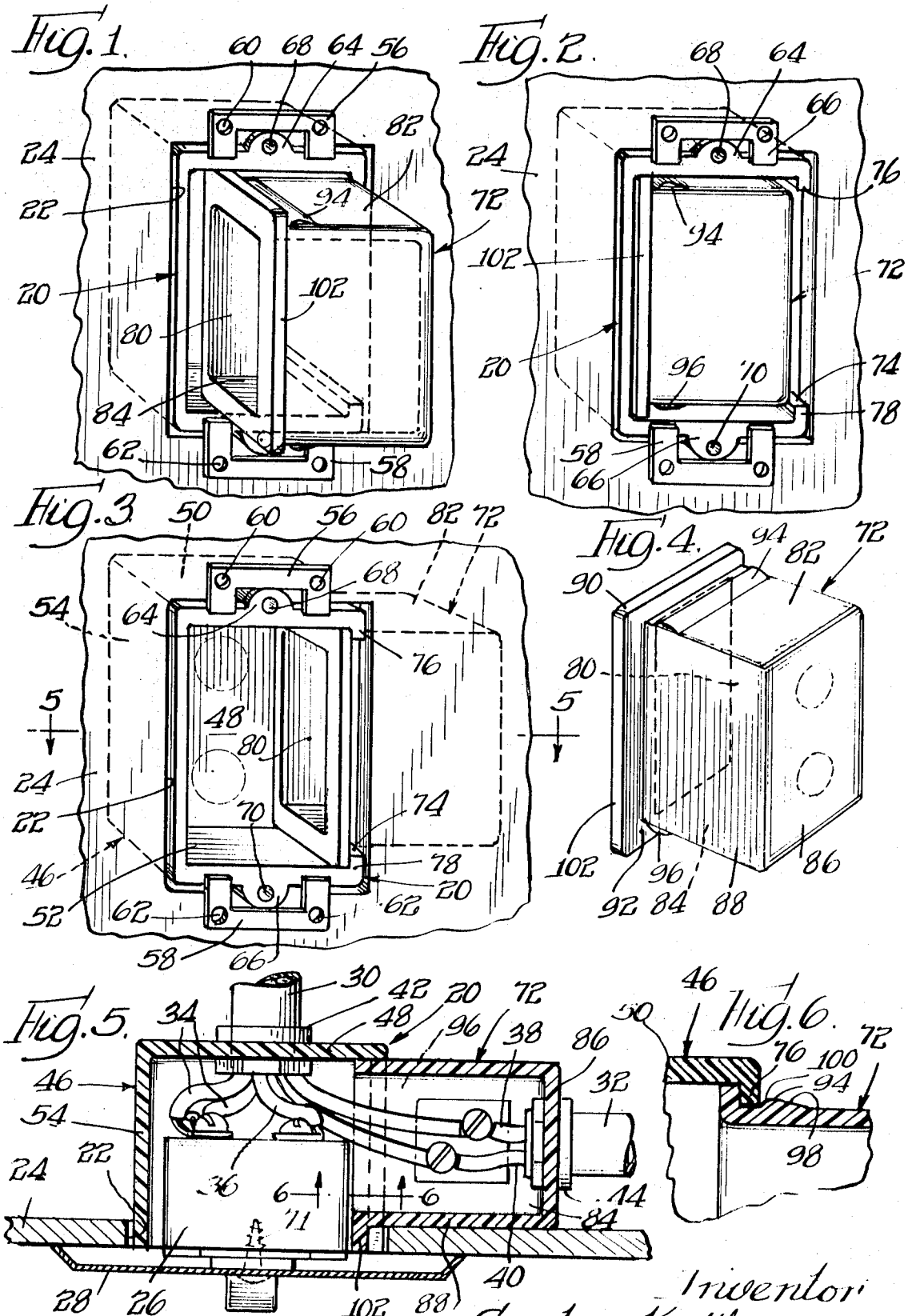

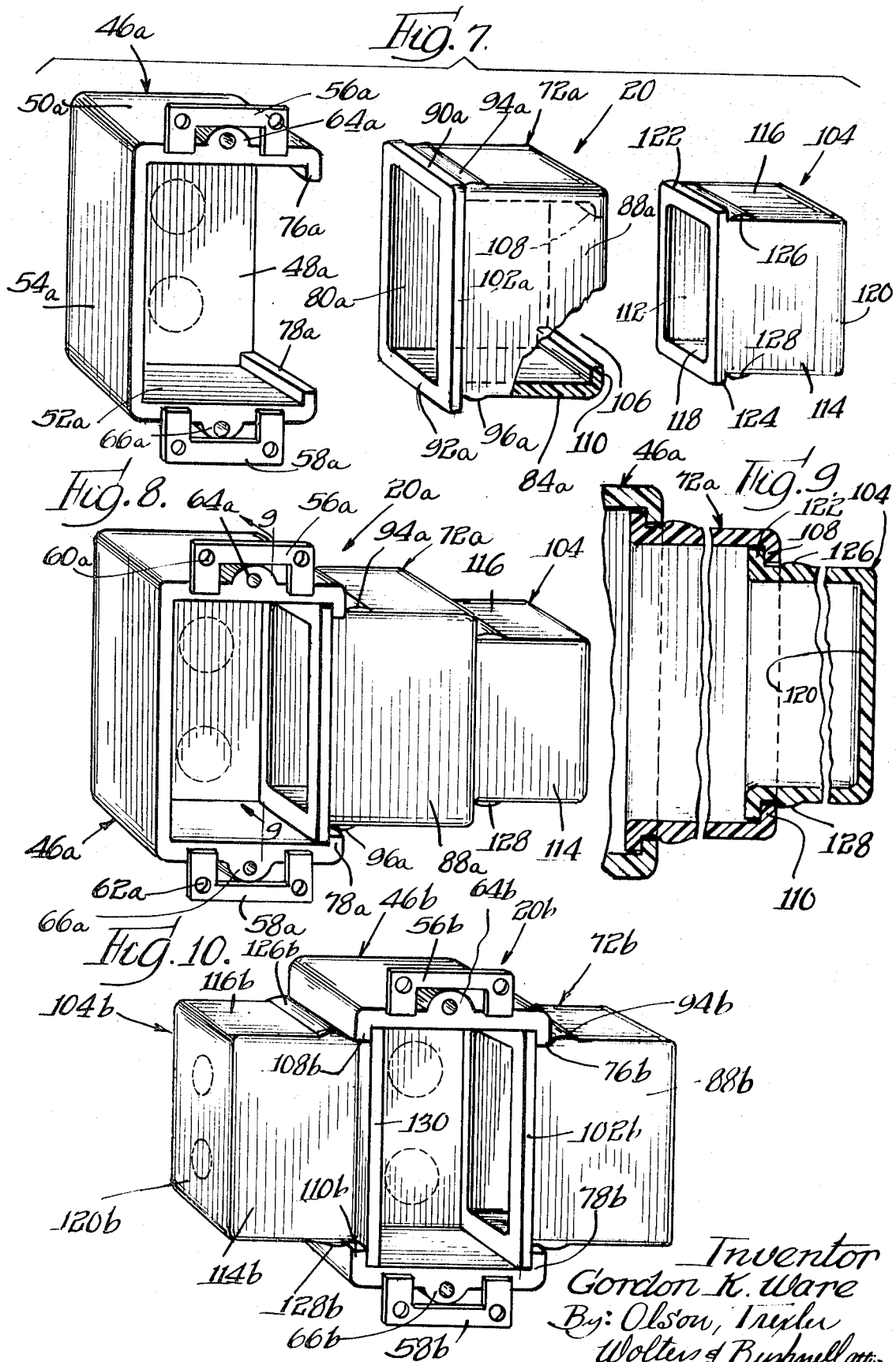

ELECTRICAL OUTLET BOX

The present invention relates to a novel box or receptacle for receiving electrical components such as outlets and switches, and more specifically to a novel receptacle or box especially suitable for use in wiring systems in a building, mobile home and the like.

As is well known, components for electrical wiring systems have been standardized as to sizes in many instances whereby components of various manufacturers are interchangeable. For example, receptacles or boxes for receiving electrical outlets, switches and the like are usually constructed to certain standardized dimensions so that they are adapted to be installed in standardized wall constructions and to receive standardized components including electrical outlets, switches and cover plates.

Electrical components of wiring systems usually must meet the specifications of various electrical codes. One of such specifications involves the relationship between the space or volume within a receptacle or box and a number and type of electrical connections or wires to be housed therein in order to minimize fire hazards. It has been found that in many instances, prior receptacles or boxes do not have sufficient internal volume to meet code requirements.

It is an important object of the present invention to provide a novel receptacle or box construction having substantially increased internal volume or capacity and at the same time being adapted to be installed in the same manner and the same locations as presently available boxes and further being adapted to receive and support presently standardized components such as outlets, switches, cover plates and the like.

A further object of the present invention is to provide a novel box or receptacle of the above-identified type which is of simple and economical construction, which may be installed using standard techniques, and which satisfies code and Underwriters' requirements.

Other objects and advantages of the present invention will become apparent from the following description and the accompanying drawings wherein;

FIG. 1 is a perspective view showing a box construction incorporating features of the present invention partially assembled with a wall;

FIG. 2 is a perspective view showing the box construction in an intermediate stage of assembly with the wall;

FIG. 3 is a perspective view showing the box construction fully assembled with the wall;

FIG. 4 is a perspective view showing one member of a box construction incorporating features of the present invention;

FIG. 5 is a sectional view taken along line 5—5 in FIG. 3 and further showing electrical components assembled within the box construction;

FIG. 6 is a fragmentary sectional view taken along line 6—6 in FIG. 5;

FIG. 7 is an exploded perspective view showing a modified form of the present invention;

FIG. 8 is a perspective view showing the elements of the FIG. 7 embodiment in assembled relationship;

FIG. 9 is an enlarged fragmentary sectional view taken along line 9—9 in FIG. 8; and FIG. 10 is a perspective view showing another modified form of the present invention.

Referring now more specifically to the drawings wherein like parts are designated by the same numerals throughout the various figures, a box construction 20 incorporating features of the present invention is shown in FIGS. 1 through 6. As will be understood, the box construction 20 is adapted to be installed at any desired location such as in an aperture 22 in a panel 24 of a wall structure. As will be described more in detail below, the box is adapted to accommodate a standard electrical component such as a switch 26 over which a standard cover plate 28 is secured. Conduit or cables 30 and 32 from which electrical conductors 34, 36, 38 and 40 extend are secured to walls of the box structure by any suitable fasteners 42 and 44 of known design.

The box structure 20 comprises a first or main box member 46 of such a size as to fit within a standard opening 22 in the wall structure. The box member 46 has a closed back or bottom wall 48 opposite closed end walls 50 and 52 and a closed sidewall 54. It is to be understood that openings may be formed in these closed walls in a known manner for accommodating one or more electrical conduits or cables. Bracket elements 56 and 58 extend from upper or outer margins of the end walls 50 and 52 for overlying the wall panel 24 or other suitable support means to which the box is to be secured. Apertures 60 and 62 are provided in the bracket elements 56 and 58 for receiving nails, screws or other fastening means used to secure the box to the wall panel or support member 24.

Bosses 64 and 66 are also provided at and project outwardly from upper or outer margins of the end walls 50 and 52. These bosses are provided with apertures 68 and 70 for receiving screws 71 securing the switch 26 or other electrical component to the box member. It is to be noted that the spacing between the apertures 68 and 70 is preferably in accordance with present standards so that the box is adapted to accommodate electrical components of standard sizes.

The depth, length and width of the box member 46 are preferably in accordance with present standard dimensions so that, as previously indicated, the box member is adapted to be installed in presently standardized wall constructions. In accordance with a feature of the present invention the box structure 20 is provided with means for increasing the volume thereof for accommodating additional wires or electrical components while at the same time permitting the box structure to be installed in substantially the same manner and in substantially the same locations as presently available boxes. More specifically, the box structure 20 comprises a second or supplemental box member 72 adapted to be telescopically associated with the box member 46. In order to accommodate the box member 72, a side of the box member 46 opposite from the closed side 54 is formed with an opening 74 defined at its opposite margins by flanges 76 and 78. The second or supplemental box member 72 is adapted to project laterally through the opening 74 as shown in FIGS. 3 and 5 when the box structure is in a fully assembled position.

The second box member 72 has a closed bottom wall 80 corresponding to the wall 48 of the box member 46 and opposite closed end walls 82 and 84. In addition, a closed sidewall 86 joins margins of the walls 80, 82 and 84. However, the opposite side of the box member 72 is open so that the interior volume of the box member 72 combines with the volume of the box member 46 for accommodating electrical wires, components and the like. While the top of the box member 46 is open, the box member 72 has a closed top wall 88. The closed walls 80 through 88 may be formed with openings in a known manner for receiving ends of electrical conduits or cables as indicated in FIG. 5.

The overall dimensions of the box member 72 are such that it may be inserted into the box member 46 as shown in FIGS. 1 and 2 and then forced laterally outwardly through the opening 74 to the position shown in FIGS 3 and 5. Thus, the overall length of the bottom and top walls 80 and 88 is similar to but slightly less than the distance between edges of the flanges 76 and 78 and the width of these walls and also of the end walls 82 and 84 is slightly less than the distance between the inner surfaces of the sidewall 54 and flanges 76 and 78 of the box member 46. Furthermore, the height of the end walls 82 and 84 and of the sidewall 86 is substantially less than the height of the corresponding walls of the box member 46 so that the box member 72 is adapted to fit flush against the interior surface of the wall 48 and project beneath the interior surface of the panel 24 without interfering with the panel as shown in FIG. 5.

In order to retain the supplemental box member 72 in its extended position with respect to the box member 46, flanges 90 and 92 are formed on and project laterally outwardly from opposite ends 82 and 84 of the box member 72 for engaging behind the flanges 76 and 78. In addition, cam elements 94 and 96 are located on the outer sides of the end walls 82 and 84 for engaging outer edges of the flanges 76 and 78 in a manner for clamping the flanges 90 and 92 against the inner sides of the flanges 76 and 78. Furthermore, the flanges 90 and 92 and the cam elements 94 and 96 preferably extend for the full height of the flanges 76 and 78 for effectively sealing the junction between the box members against the passage of sparks and the like in the event of fire. As shown best in FIG. 6, the cam elements 94 and 96 which are essentially identical have a gradually tapering outer surface portion 98 for facilitating passage of the cam elements through the opening 74 and a relatively sharply inclined trailing portion 100 for aggressively engaging the outer edge of the flanges 76 and 78.

As indicated in FIG. 5, upper or outer margins of the walls 50, 52 and 54 of the main box member 46 extend substantially through the opening 22 for shielding the adjacent edges of the panel 24 from the interior of the box structure. In addition, the supplemental box member 72 is provided with a flange 102 merging at opposite ends with the side flanges 90 and 92 and projecting upwardly from the top wall 88. The flange 102 projects a distance similar to the thickness of the panel 24 for also serving to shield an adjacent edge of the panel from the interior of the box structure. The box members 46 and 72 may be formed from any suitable fireproof or fire-resistant material. In the embodiment shown, the parts are formed from a fire-resistant plastic or resinous material, but it is to be understood that the parts may also be formed from metal or in a combination of plastic and metal.

In assembling the box structure with a wall, the opening 22 is first formed in the usual manner. Then the box member 46 either with or without the member 72 positioned therein is inserted into the opening 22 and secured by driving nails, screws or other fasteners through the openings in the brackets 56 and 58. Then the box member 72 is pushed laterally through the opening 74 and forced outwardly until the cam elements 94 and 96 snap through the opening and engage behind the flanges 76 and 78 for securing the box member 72 in its extended position. Thereafter, any desired combination of electrical components may be assembled within and secured to the box structure in the usual manner.

FIGS. 7 through 9 show a modified form of the present invention which is similar to the structure described above as indicated by the application of identical reference numerals with the suffix *a* added to corresponding parts. This embodiment differs in that the interior volume of the box structure is further increased by the inclusion of a third supplemental box member 104. In order to accommodate the box member 104 in this embodiment, the heretofore closed side of the second supplemental box member is formed with an opening 106 defined by flanges 108 and 110 which correspond to and function in the same manner as the flanges 76a and 78a.

The box member 104 is provided with closed bottom and top walls 112 and 114, closed opposite end walls 116 and 118 and a closed outer sidewall 120. The side of the box member opposite from the sidewall 120 is open so as to provide communication with the remainder of the box structure. Apertures may be provided in the closed walls of the box member 104 for receiving end portions of electrical conduits or cables and the like.

The walls of the box member 104 are dimensioned so that it is adapted to fit entirely within the box member 72a during initial assembly of the box structure with a wall and prior to extension of the supplemental box members to the position shown in FIG. 8. In order to secure the box member 104 in the extended position, it is provided with flanges 122 and 124 engageable with one side of the flanges 108 and 110 respectively and cam elements 126 and 128 adapted to be snapped around the flanges 108 and 110. The flanges 122 and 124 and cam elements 126 and 128 correspond essentially in structure and function to the flanges 90a and 92a of the box member 72 and the cam elements 94a and 96a of the box member 72a.

FIG. 10 shows a box structure 20b incorporating another modified form of the present invention which is similar to the structure described above as indicated by the application of identical reference numerals with the suffix *b* added to corresponding elements. In this embodiment both sides of the main box member 46b are provided with openings and the third box member 104b is adapted to be assembled with the main box member 46b so as to extend laterally therefrom oppositely from the box member 72a in the manner shown. The box member 104b is essentially identical to the box member 72b and thus includes a flange 130 for sealing an edge of the wall panel in the same manner as the flange 102b.

When installing the box structure 20b, the members 46b and 72b are assembled and positioned in the manner described above in connection with the corresponding elements of box structure 20. Then the box member 104b is inserted into the box member 46b and shifted laterally outwardly to its extended position. The dimensions of box member 104b may be substantially the same as those of the box member 72b except that the overall width of the member 104b between the outer surface of the end wall 120b and the oppositely facing surfaces of the flanges 122b, 124b and 130 is slightly less than the distance between the inner surfaces of the flanges 108b and 110b in the opposing end of the box member 72b so that the box member 104b may be inserted into the box member 46b after the box member 72b has been shifted to its extended position.

While preferred embodiments of the present invention have been shown and described herein, it is obvious that various changes in the structural details may be made.

The invention is claimed as follows:

1. A box structure of the type described including first and second hollow box members telescopically connected for enabling the second box member to be shifted between a first position within said first box member and a second position extending through an opening in a sidewall of said first box member, means on said first box member for supporting an element such as an electrical component within said first box member, and said second box member having an open side facing said first box member, opposed inwardly projecting marginal portions defining said first member opening, said second box member including outwardly projecting stop means engageable with inner faces of said marginal portions, and elongated outwardly projecting cam elements on said second box means paralleling the edges of the open side thereof and adapted to be snapped outwardly through said opening for engaging the outer faces of said marginal portions when said second box member is fully extended through said first box member opening, said opposed marginal portions and said cam elements extending along substantially the full length of said margins for effectively sealing the connection between said first box member opening and the second box member.

2. A box structure, as defined in claim 1, wherein said first box member has an open side through which said electrical component may be installed, and all sides of said second box member other than said open side of the second box member being substantially closed.

3. A box structure, as defined in claim 1, which includes a third box member telescopically connected with one of said first and second box members for enabling the third box member to be shifted between a first position within said one box member to a second position extending through an opening in one wall of said one box member.

4. A box structure, as defined in claim 3, wherein said third box member is telescopically connected with said second box member.

5. A box structure, as defined in claim 3, wherein said third box member is telescopically connected with said first box member.

6. A box structure of the type described comprising a first box member including a first wall, sidewalls being at an angle to said first wall and extending in one direction from said first wall with margins of said sidewalls oppositely from said first wall terminating substantially in a predetermined plane and defining the open side of the first box member opposite from said first wall, one of said sidewalls having an opening therethrough defined by inwardly projecting marginal portions which are opposite to each other, and a second box member telescopically associated with said first box member for movement between a first position substantially within said first box member to a second position extending through said opening defined by said marginal portions, said second box member having a substantially closed wall in a position corresponding to the position of the open side of the first box member and offset from said plane in a direction toward said first wall, and said second box member also including an outwardly projecting flange portion substantially at an inner end thereof and projecting from said closed wall substantially to said predetermined plane, and interengageable means on said box members for retaining said second box member in said second position, with said second box member having a substantially open side facing said first box member.

7. A box structure, as defined in claim 6, wherein said interengageable means comprises oppositely extending flanges on said second box member engageable with inner sides of said marginal portions, and cam elements on opposite sides of said second box member adjacent its flanges and being sized for snapping through said opening for engaging opposite sides of said marginal portions.

8. A box structure, as defined in claim 6, which includes a pair of mounting means on said sidewalls and spaced apart a predetermined distance in accordance with standard sizes of electrical components to be mounted within said first box member.

9. An electrical outlet box structure comprising a first box portion including a first wall, sidewalls extending from and at an angle to said first wall in one direction from said first wall, margins of said sidewalls oppositely from said first wall terminating substantially in a predetermined plane and defining an open side of said box portion opposite from said first wall, said box portion also having an open side oppositely from one of said sidewalls, and a second box portion associated with said first box portion and extending outwardly from said second mentioned open side and being in open communication with said first box portion, said second box portion having a substantially closed wall in a position corresponding to the position of the first mentioned open side of the first box portion and being offset from said plane in a direction toward said first wall, and said box structure including marginal sidewall portions substantially completely defining said first mentioned open side of the first box portion and projecting outwardly with respect to said closed wall substantially to said predetermined plane.

* * * * *

Disclaimer 3,622,029.—*Gordon K. Ware*, Chicago, Ill. ELECTRICAL OUTLET BOX. Patent dated Nov. 23, 1971. Disclaimer filed Nov. 24, 1972, by the assignee, *Ware Fuse Corporation*.

Hereby enters this disclaimer to claim 9 of said patent.

[*Official Gazette March 13, 1973.*]